Oct. 15, 1929.  M. H. MARTIN  1,731,470
RAILWAY CAR TRUCK BOLSTER
Filed Aug. 23, 1926  4 Sheets-Sheet 1
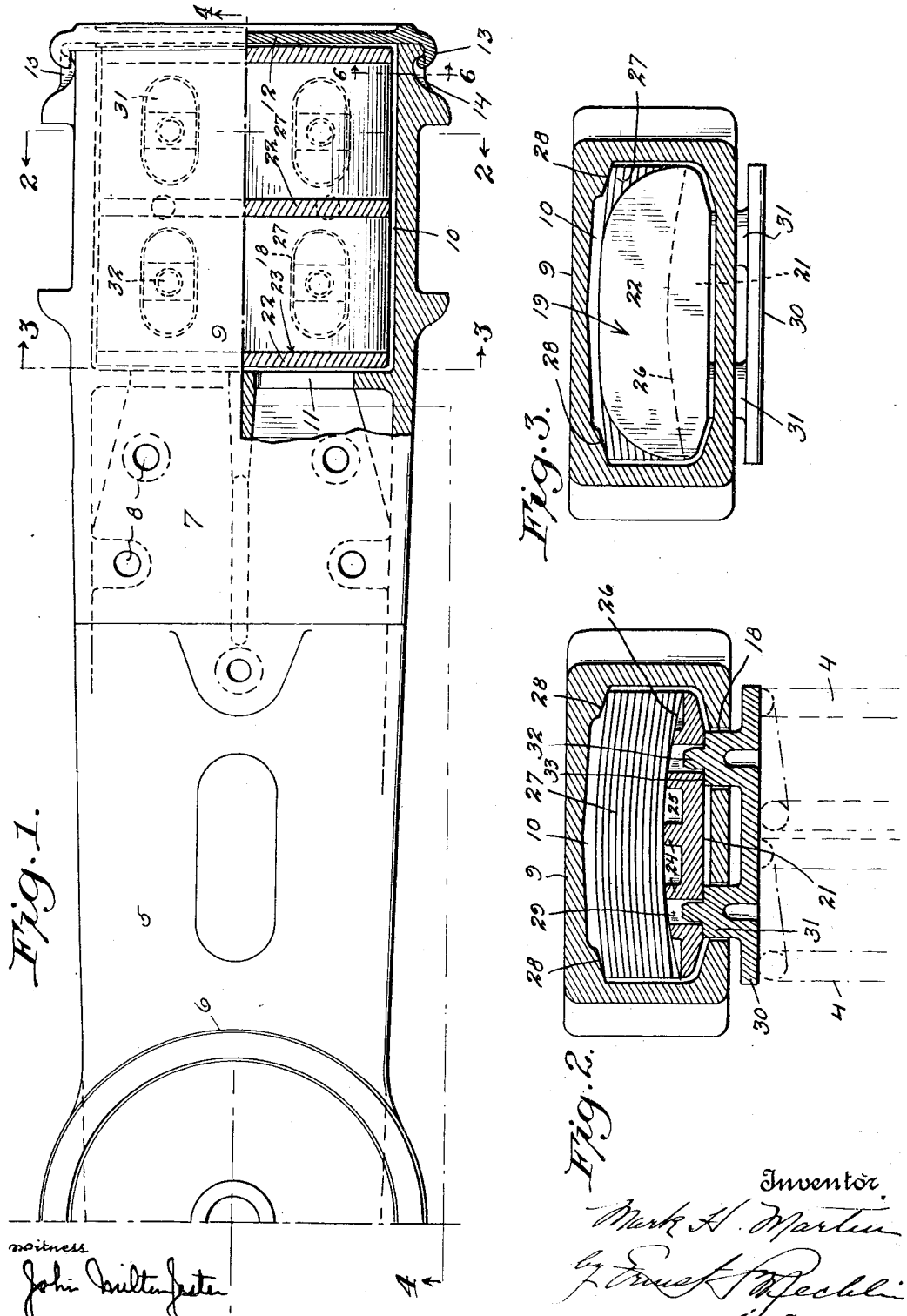

Oct. 15, 1929.  M. H. MARTIN  1,731,470
RAILWAY CAR TRUCK BOLSTER
Filed Aug. 23, 1926  4 Sheets-Sheet 2
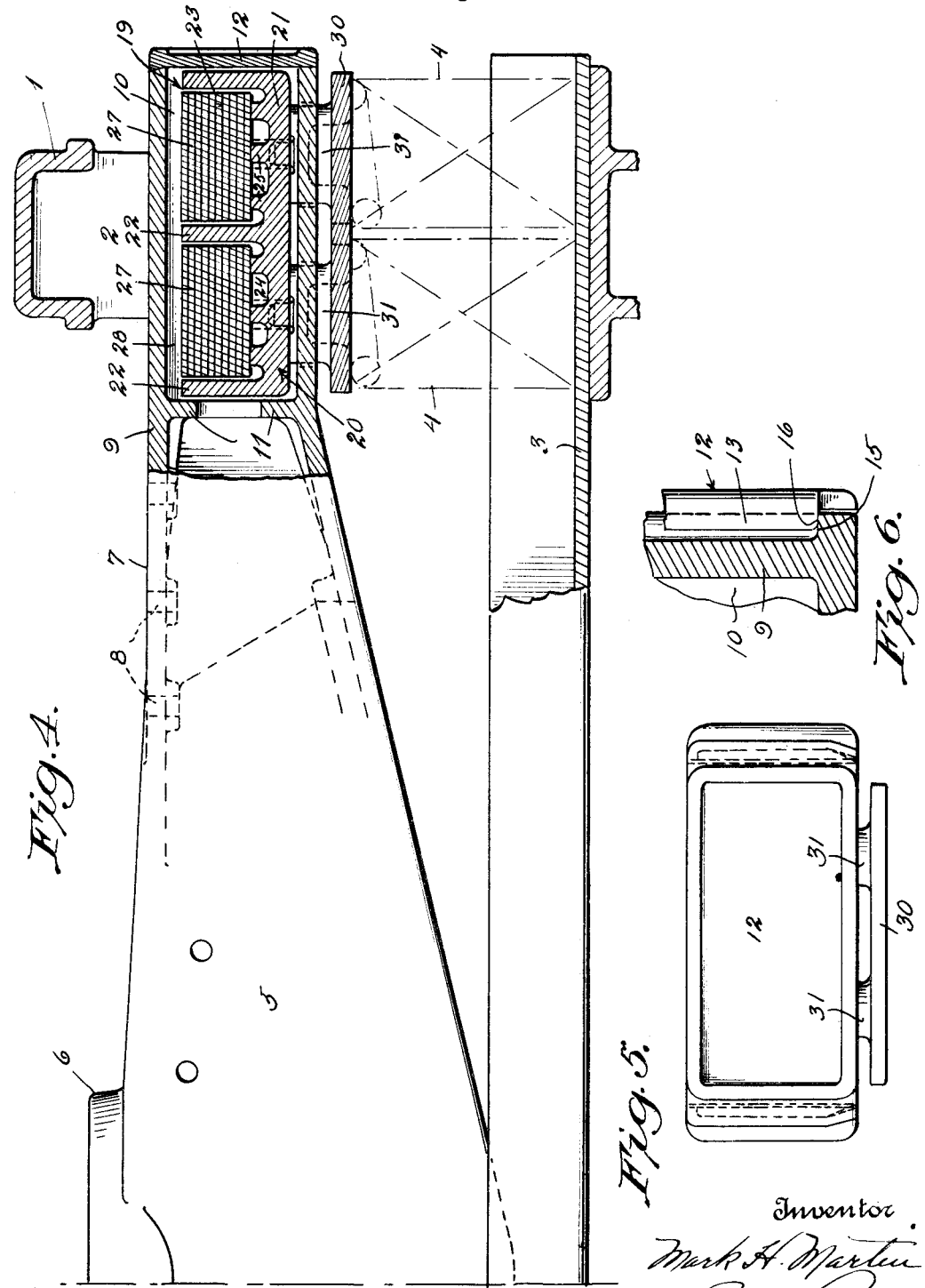

Oct. 15, 1929.  M. H. MARTIN  1,731,470
RAILWAY CAR TRUCK BOLSTER
Filed Aug. 23, 1926  4 Sheets-Sheet 3

Oct. 15, 1929.   M. H. MARTIN   1,731,470
RAILWAY CAR TRUCK BOLSTER
Filed Aug. 23, 1926   4 Sheets-Sheet 4
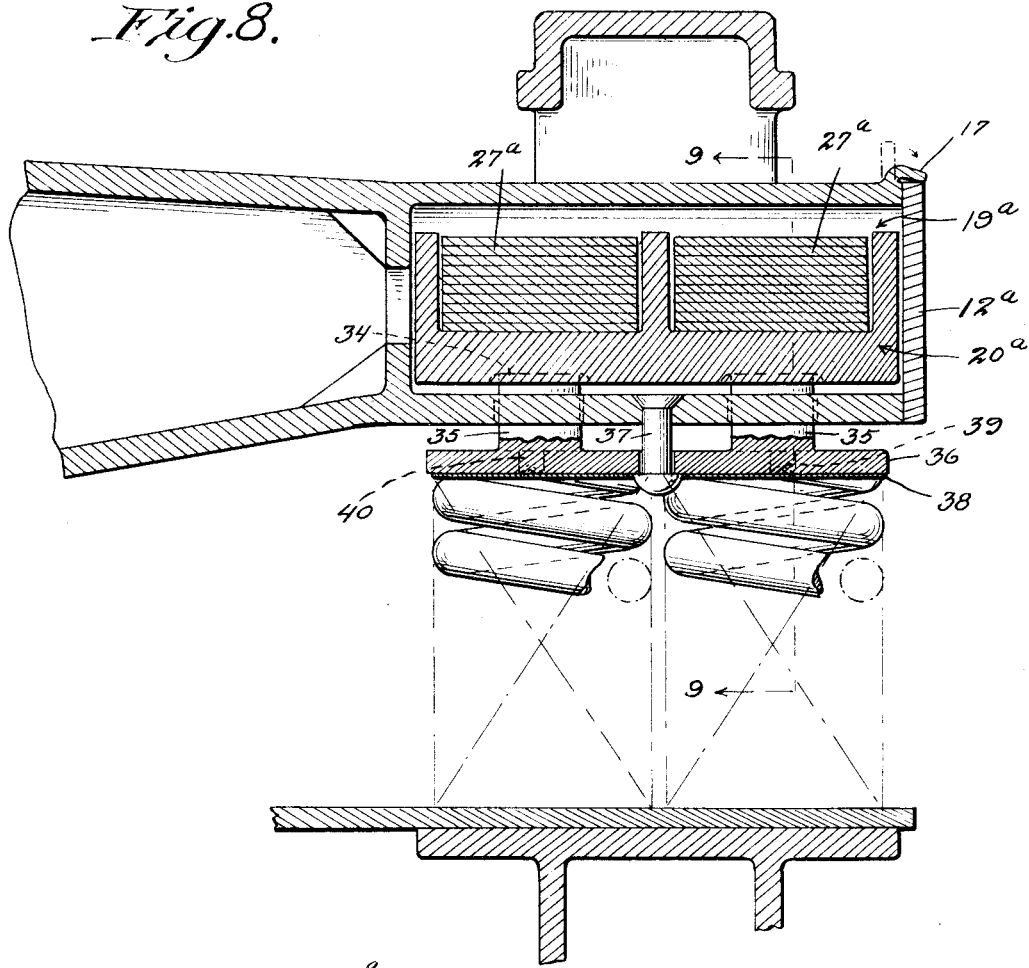
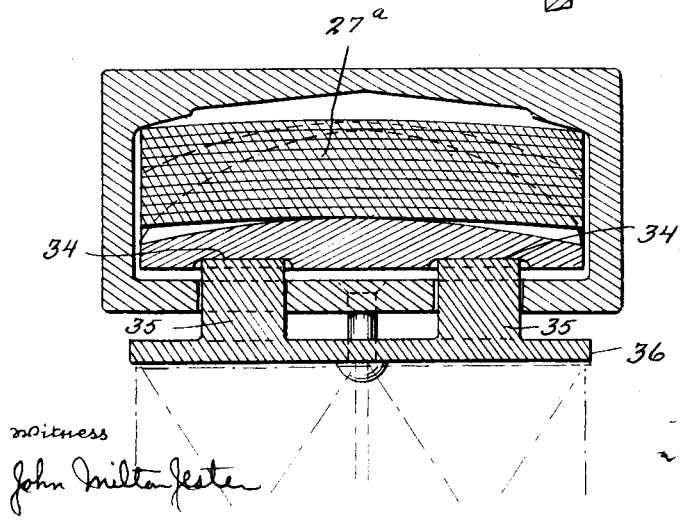

Patented Oct. 15, 1929

1,731,470

UNITED STATES PATENT OFFICE

MARK H. MARTIN, OF BALTIMORE, MARYLAND, ASSIGNOR, BY MESNE ASSIGNMENTS, TO T. H. SYMINGTON AND SON, INC., OF BALTIMORE, MARYLAND, A CORPORATION OF MARYLAND

RAILWAY-CAR-TRUCK BOLSTER

Application filed August 23, 1926. Serial No. 131,004.

The invention relates to railway car trucks and has particular reference to truck bolsters.

The principal object of the invention, generally stated, is to provide a truck bolster having in combination therewith cushioning or spring means operating in series with whatever truck springs are provided for supporting the bolster within the side frames of the truck.

Differently stated, the object of the invention is the provision of spring or cushioning means arranged auxiliary to or in conjunction with the truck springs in the side frame but having a different period of vibration from that of the main or truck springs to break up synchronism and consequently reduce the development of car roll or side sway and to eliminate, or at least greatly decrease, "jiggling".

Another object of the invention is to provide cushioning means of this character which will act to increase the spring capacity, consequently reducing the strain on all of the truck and other parts during car travel, especially under heavy load conditions.

Another object of the invention is the provision of a truck bolster embodying within itself auxiliary spring means operating in series with the truck springs.

Another object of the invention is to utilize auxiliary spring means in series with existing truck spring means to give a resulting spring travel greater than that now existing. The advantage is realized when one car wheel passes over a low spot in the track, at which time spring pressure is constantly applied to the low wheel, preventing its possible lifting.

A further object is the provision of a truck bolster in which the cushioning or spring means may be entirely enclosed and consequently fully protected against injury from any cause and against damage by the ingress of water, grit or other foreign matter which might enter if the parts were exposed.

A more specific object of the invention is to provide a truck bolster having each end of hollow formation for the accommodation of the spring or cushioning means, the bottom of each end of the bolster being substantially closed and the ends being open to permit installation of the spring means, means being provided for closing the ends subsequent to installation of the interiorly arranged parts.

Another object of the invention is to provide a truck bolster so constructed and arranged that the spring or cushioning means used in conjunction therewith may be fully assembled prior to insertion within the hollow end of the bolster, the work of installation being consequently greatly simplified, this feature being of special advantage in case it is ever necessary or desirable to remove the auxiliary spring means and replace it with new structure as for instance in the event that the leaf or plate springs provided should lose their resilience.

A still more specific object of the invention is the provision of a truck bolster having its ends formed with substantially rectangular chambers within which are slidably removably mounted followers each of which carries a bank or banks of plate or leaf springs retained therein, elements being formed on the follower for spacing apart the different banks or groups, if a plurality be employed.

Another object of the invention is the provision of a truck bolster in which the end portions are equipped with interiorly arranged and located spring devices actuated by projections passing through holes in the otherwise solid bottom of the bolster, the projections forming part of followers or spring seats engaged upon the truck springs.

A still further object of the invention is to provide a truck bolster of this type in which the seat member engaged upon the truck springs and acting to apply pressure to the follower of the auxiliary spring structure may be initially attached with respect to the bolster to prevent disassociation during transportation or storage or at any time prior to the installation of the truck bolster within a truck, the retaining means being capable of removal when the bolster is in applied and operative position.

Still another object of the invention is to provide a mechanism of this character in which shims may be applied to the seat member engaging upon the truck springs for the purpose of taking up wear or for increasing the initial compression of the truck springs with respect to the bolster or of the spring elements of the auxiliary spring structure.

Yet another object of the invention is the provision of a truck bolster embodying the auxiliary spring mechanism but constructed in such manner as to be interchangeable with already existing bolsters and therefore capable of employment in connection with standard equipment without involving any changes in the construction thereof.

An additional object of the invention is to provide a combination and arrangement of this character which will be simple and inexpensive to manufacture, assemble and install, efficient in action, durable in service, and a general improvement in the art.

With the above and other objects and advantages in view, the invention preferably consists in the combination and arrangement of parts and the structural features to be hereinafter more fully described and claimed, and illustrated in the accompanying drawings in which:

Figure 1 is a view partly in top plan and partly in horizontal section, showing one end portion of a bolster embodying the preferred form of the invention.

Figure 2 is a vertical cross sectional view taken on the line 2—2 of Figure 1 and looking in the direction of the arrows.

Figure 3 is a similar view taken on the line 3—3 of Figure 1 and looking in the direction of the arrows.

Figure 4 is a view partly in side elevation and partly in section, this view being taken on the line 4—4 of Figure 1 and looking in the direction of the arrows.

Figure 5 is an end elevation of the truck bolster alone or removed from the side frame.

Figure 6 is a detail cross sectional view taken on the line 6—6 of Figure 1 and illustrating the closure plate retaining means.

Figure 8 is a vertical longitudinal sectional view taken on the line 8—8 of Figure 7.

Figure 9 is a cross sectional view taken on the line 9—9 of Figure 8.

Figure 7:
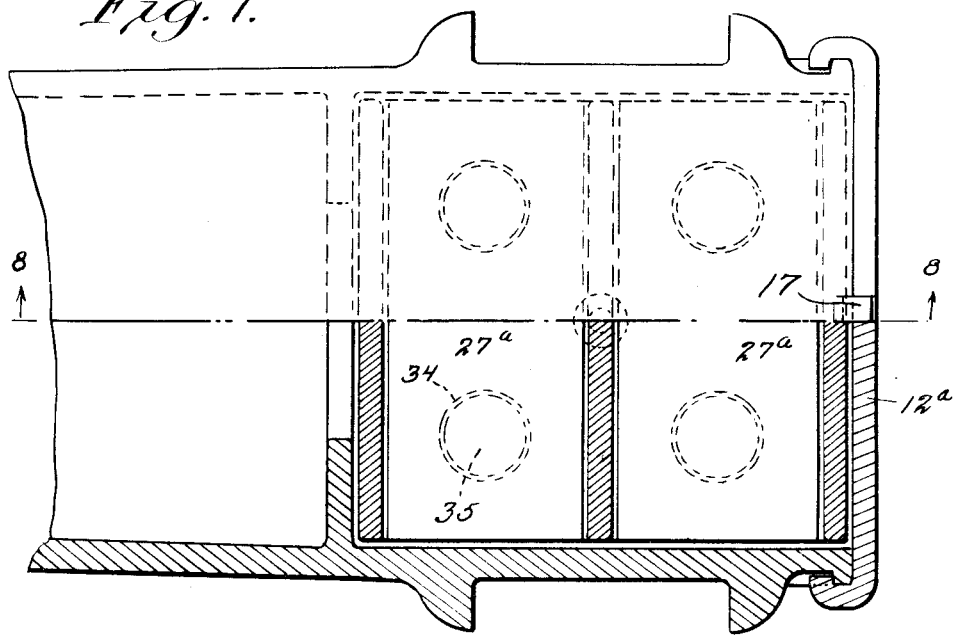
Figure 7 is a view similar to Figure 1 showing a slight modification of the invention.
Figure 10:
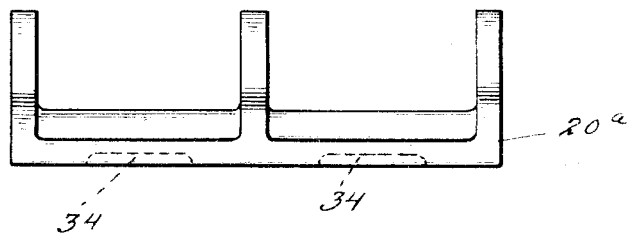
Figure 10 is a side elevation of the combined retainer and follower for the auxiliary springs, showing the form thereof employed in the modification.
Figure 11:
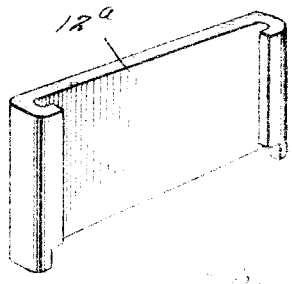
Figure 11 is a perspective view looking at the inside face of the end closure plate.

Referring to the drawings it will be observed that I have disclosed only one end of the bolster and a portion of one side frame in which it is mounted inasmuch as the structure is identically the same at both sides of the truck.

Referring to the drawings in detail, the numeral 1 designates a portion of a truck side frame having the usual window opening 2 within which extends the spring plank 3 supporting the truck springs 4 which are shown diagrammatically and which support the bolster 5. This bolster may be of any ordinary or preferred shape and may be of standard construction in most respects and of that type in which the load is supported either by the center bearing 6 or by side bearings, not shown, adapted to be mounted on the bolster at the seat 7 which is here shown as having holes 8 for the passage of whatever securing elements may be needed to effect mounting of the side bearings.

Notwithstanding the fact that the major portion of the bolster may be of ordinary type, in accordance with the present invention the end portion 9 which extends within the window opening 2 for cooperation with the truck springs 4 is of hollow formation or provided with a pocket 10 which may be of general elongated rectangular shape in cross section with certain limitations to be described. The pocket portion 10 is shown as separated from the interior of the main portion or body by webs 11 which act to a certain extent as retaining means for the spring structure to be described and which act also as reinforcements. In the present embodiment of the invention the pocket 10 is shown as opening out at the outer end of the bolster, or in other words, the outer end of the bolster is entirely open though adapted to be closed by a closure plate 12 held in place by some suitable means as for instance by reversely extended flanges 13 engaging slidably within guide grooves 14 in opposite sides of the bolster, ledges 15 being provided at the lower ends of these grooves engaged by shoulders 16 at the lower ends of the flanges, as indicated in Figure 6, these ledges preventing downward movement of the end closure plate beyond a certain desired extent. Any desired means may be provided for holding the closure plate 12 in its normal or closing position though in Figures 7 and 8 I have shown the top of the bolster as having an upstanding lug 17 adapted to be bent or mashed over or onto the upper edge of the plate. The bottom of the pocket is represented as solid except for the provision of holes 18 for a purpose to be described.

The auxiliary spring means operating in conjunction and in series with the truck springs 4 may be considered a complete unit designated by the numeral 19 and is here shown as comprising a combined retainer and follower member 20· capable of being formed as a single casting and constructed in such manner as to fit closely within the pocket 10 while capable of being slid into or out of the same as is of course necessary during installation or in case of replacement. This member is shown as comprising a bottom portion 21 formed with a plurality of upstanding wall portions 22 defining compartments 23. Two of such compartments are illustrated in the present instance though it should be distinctly understood that there is no limitation as to the number. These wall portions 22 are necessarily of less height than the inside height of the pocket 10 in order that the member 20 will be capable of vertical movement with respect to the bolster. While it is readily conceivable that the bottom 21 of the member 20 may be solid throughout, as shown in Figures 8 and 9, it is preferably formed with intersecting ribs 24 and 25, the former extending longitudinally with respect to the bolster and the latter extending laterally with respect thereto and having convex upper surfaces 26 constituting a seat for groups of plate or leaf springs 27 arranged within the respective compartments 23, the number of groups or banks corresponding to the number of compartments. At the upper corners of the pocket are provided ledges 28 against which the ends of the uppermost leaves or plates in the groups or banks engage, and these ledges are preferably inclined to conform substantially to the topmost leaves or plates when the springs are flexed to their maximum extent. Inasmuch as the ledges 28 are located at lower points than the central portion of the top of the pocket 10, it is clear that the groups or banks of springs will have ample room in which to flex. Owing to the convexity of the bearing surfaces 26 for the undersides of the lowermost plates or leaves in the groups or banks of springs, it is obvious that the strains or the pressure transmitted or applied to the springs will be distributed throughout a large portion of the area thereof instead of being concentrated at any certain points or lines as might be the case if the construction were different. The bottom 21 of the member 20 is preferably provided with a plurality of holes 29 which are located concentrically of or in alinement with the holes 18 in the bottom of the bolster when the auxiliary spring unit or assembly 19 is in proper position within the pocket 10.

Located beneath the bolster is a spring seat member 30 engaging upon the upper ends of the truck springs 4 provided at its upper surface with a plurality of projections 31 extending slidably through the holes 18 in the body of the bolster and terminating in reduced extensions 32 loosely engaged within the holes 29 in the bottom of the member 20. In the present instance the holes 18 and projections 31 are represented as of substantially elliptical shape, whereas the reduced extensions 32 are shown as cylindrical. It should, however, be understood that the exact shape of these elements is immaterial and capable of variation. It will be noted that the ends of the extensions 32 are preferably tapered to facilitate the entrance thereof into the holes 29 when the seat member 30 is placed in position with respect to the bolster. The formation of the reduced extensions 32 defines shoulders 33 which abut against the underside of the bottom 21 of the member 20 so that the seat member constitutes a force applying means for transmitting pressure upwardly against the follower. Inasmuch as the reduced extensions 32 engage within the holes 29 it is clear that they act as retaining means for holding the follower, together with the springs carried thereby, in proper operative position within the pocket, it being impossible for the follower to slip out of the bolster even though the end closure plate therefor should be lost.

As a modification, the member 20$^a$ shown in Figures 8 and 9 and corresponding to the member 20 may be formed in its underside simply with recesses 34 receiving upstanding projections 35 formed on a seat member 36 corresponding to the seat member 30 which engages upon the truck springs, the projections 35 being comparatively large to possess the necessary mechanical strength for transmitting loads to the plate or leaf springs indicated at 27$^a$. In the modified form and particularly as shown in Figures 8 and 9, the seat member 36 may be initially connected with the bottom of the bolster as by a rivet 37 to prevent disassociation of the parts during transportation, storage or handling at any time. If desired, such retaining means might be provided in connection with the form of the invention disclosed in Figures 1 to 6, inclusive, though such is not illustrated. Such a retaining element 37 might be left in position even after the bolster is installed within a truck though such is probably unnecessary.

If, for any reason it is found desirable, as for example in case of wear of the parts, slight loss of elasticity in the springs, or in case it is desired to increase the initial compression of the spring means, shims disclosed at 38 in Figure 8 may be interposed between the seat 30 or 36, as the case may be, and the truck springs, these shims being held in place in any desired manner as by means of upstruck projections 39 thereon entering holes 40 in the seat.

In assembling the structure it is clear that the end closure plate of the bolster must initially be removed, subsequently to which the entire unit 19 in the first form of the invention or 19$^a$ in the second form is slid into place, the end closure plate 12 or 12$^a$ being then placed in position and secured by any means provided for the purpose. The seat 30 or 36 may then be placed in position with the projections thereon passing through the holes in the bottom of the bolster and engaging the follower of the auxiliary spring unit and if any retaining means, such as that disclosed at 37, is employed such should then be placed in position to maintain the parts assembled. The bolster and the truck spring engaging seat may then be mounted in the truck in an obvious manner.

In the operation it will be seen that the truck springs 4 perform their function in the usual manner and that the banks or groups of plate springs constituting the auxiliary cushioning means act in series with the truck springs. The period of vibration of the plate or leaf springs is different from that of the truck springs and as a result synchronism is broken up or avoided, the natural consequence being that the development of car roll or side sway is checked and vertical "jiggling" either eliminated entirely or reduced to the minimum. Naturally there will be a certain amount of friction developed between the plate springs during their flexure and this friction is of benefit in absorbing sudden vibrations and jars as well as acting to increase the capacity of the springs.

Logically, the provision of the auxiliary plate or leaf springs will greatly increase the load carrying capacity and will avoid the bringing of undue strains not only upon the springs themselves but also upon any of the parts of the truck. In view of the fact that the auxiliary spring mechanism is entirely enclosed within the bolster itself it is evident that the parts will be protected against injury and against the ravages of the weather and the deteriorating influences of the ingress of dirt and grit. Furthermore, the bolster embodying the auxiliary cushioning and shock absorbing means may be constructed in such manner as to be readily interchangeable with already existing bolsters so that no modifications or alterations in the construction of the side frames, truck springs or other parts will be necessary to permit utilization of the new structure. It is believed that the construction, operation and advantages will be readily apparent to one skilled in the art without further explanation.

While I have shown and described preferred embodiments of the invention it should be understood that the entire disclosure is merely an exemplification of the principles involved and that the right is reserved to make all such changes and modifications in the details as well as the arrangement and location of parts as will widen the field of utility and increase the adaptability of the invention, provided such variations constitute no departure from the salient features of the invention or the scope of the claims hereunto appended.

Having thus described my invention, I claim:

1. In a railway car truck, the combination with the side frames, bolster and bolster supporting springs, of friction producing spring means interposed in series with and engaged upon the truck springs.

2. In a railway car truck, the combination with the side frames, bolster and helical bolster supporting springs, of auxiliary spring means interposed in series with the truck springs, said auxiliary spring means being enclosed within the bolster.

3. In a railway car truck, including side frames, a bolster, and truck springs supporting the bolster, the combination of friction producing means interposed between the truck springs and the bolster and operating in series with the former.

4. In a railway car truck including side frames, a bolster and truck springs supporting the bolster, the combination of auxiliary spring means interposed between the truck springs and the bolster and operating in series with the former, the auxiliary springs having a different period of vibration from the truck springs to avoid synchronism, and means within the side frames seating upon the truck springs for applying flexing pressure upon the auxiliary spring means.

5. A railway car truck bolster containing friction producing means adapted to operate in series with truck springs for supporting the bolster.

6. In a railway car truck including a bolster, side frames and helical truck springs mounted in the side frames for supporting the bolster, auxiliary leaf spring means located within the bolster, and means interposed between the truck springs and said auxiliary spring means for operating the latter in series with the former.

7. In a railway car truck, side frames, truck springs located entirely within the side frames, a bolster extending into the side frames and supported by the truck springs, auxiliary spring means within the bolster and within the confines of the side frames, and members interposed between the truck springs and the auxiliary spring means for applying pressure to the latter in series with the application of pressure to the former.

8. A truck bolster provided interiorly with spring and friction producing means entirely enclosed therein, the bolster being adapted to be supported by truck springs, and means engaged upon the truck springs and entering the bolster for applying pressure to the spring and friction producing means therein.

9. In combination with a truck bolster and spring supporting means therefor, shock absorbing mechanism interposed between the bolster and said spring means and including a plurality of plate springs.

10. In combination with a truck bolster and supporting springs therefor, absorption means including a plurality of plate springs located within the bolster and arranged in series with said spring means, and load operated means for flexing said plate springs.

11. The combination with a truck bolster, side frames and spring means within the side frames supporting the bolster, of auxiliary cushioning means located within the bolster for operation in series with said spring means, said cushioning means comprising a plurality of plate springs, and means interposed between said spring means and said cushioning means for effecting flexure of the plate springs forming the same.

12. In combination with a truck bolster, side frame and spring means carried by the side frame for supporting the bolster, auxiliary cushioning means located within the bolster and comprising a combined follower and retainer, a plurality of plate springs mounted within the combined follower and retainer and carried thereby, and means engaging said spring means and entering the bolster for applying pressure against said combined follower and retainer for flexing the plate springs therein.

13. In combination with a truck bolster, side frame and spring means carried by the side frame for supporting the bolster, auxiliary cushioning means located within the bolster and comprising a combined follower and retainer, a plurality of plate springs mounted within the combined follower and retainer and carried thereby, and means engaging said spring means and entering the bolster for applying pressure against said combined follower and retainer for flexing the plate springs therein, the bolster having a removable portion permitting insertion and removal of the combined follower and retainer with the plate springs therein as a unit.

14. In combination with a truck bolster, side frame and spring means carried by the side frame for supporting the bolster, auxiliary cushioning means located within the bolster and comprising a combined follower and retainer, a plurality of plate springs mounted within the combined follower and retainer and carried thereby, and means engaging said spring means and entering the bolster for applying pressure against said combined follower and retainer for flexing the plate springs therein, the bolster being formed with a pocket for the accommodation of the auxiliary cushioning means and having a removable end wall permitting access thereto.

15. In combination with a truck bolster, side frame and spring means within the side frame supporting the bolster, auxiliary cushioning means for the bolster located entirely therewithin and comprising a follower and a plurality of plate springs carried thereby, and a seat member engaged upon said spring means and having portions extending into the bolster and engaging said follower for flexing the plate springs.

16. In combination with truck side frames and spring means therein, a truck bolster provided at each end with a pocket and having the bottom of each end formed with openings, auxiliary cushioning means located within each pocket and comprising a follower and a plurality of plate springs carried thereby, and a member seated upon the spring means within each seat frame and carrying upstanding means extending through the holes in the bolster and engaging the follower for flexing the plate springs carried thereby.

17. In a railway car truck including side frames and spring means within the side frames, a bolster adapted to be supported upon the spring means, the bolster being formed at each end with a pocket and having the bottom of the pocket provided with openings, a follower removably arranged within each pocket and having a convex upper surface, the top wall of the pocket having ledges at opposite sides thereof, a plurality of superposed plate springs mounted on and within the follower with the ends of the topmost engaging against said ledges, and a force applying member seated upon the spring means and entering the bolster through said holes for applying pressure to the underside of the follower to flex the springs.

18. In a railway car truck including side frames and spring means within the side frames, a bolster adapted to be supported upon the spring means, the bolster being formed at each end with a pocket and having the bottom of the pocket provided with openings, a follower removably arranged within each pocket and having a convex upper surface, the top wall of the pocket having ledges at opposite sides thereof, a plurality of superposed plate springs mounted on and within the follower with the ends of the topmost engaging against said ledges, and a force applying member seated upon the spring means and entering the bolster through said holes for applying pressure to the underside of the follower to flex the springs, the follower being formed with a plurality of compartments, and the plate springs being arranged in groups within the respective compartments.

19. In a railway car truck, side frames, spring means within the side frames, a bolster having its ends extending within the side frames to be supported upon the spring means, each end of the bolster being formed with a pocket with a removable outer end wall, the bottom of the pocket having openings therein, a follower removably mounted within each pocket and having its bottom formed with openings, a plurality of leaf springs mounted on the follower, and a force applying member interposed between the spring means and the bolster and having portions extending through the openings in the bolster for egagement with the underside of the follower and having other portions entering the holes in the follower.

20. In a railway car truck, side frames, spring means within the side frames, a bolster extending into the side frames for support by said spring means, a plurality of plate springs located within each end of the bolster, and means interposed between said spring means and said plate springs for flexing the latter.

21. In a railway car truck, side frames, spring means within the side frames, a bolster extending into the side frames for support by said spring means, a plurality of plate springs located within each end of the bolster, means interposed between said spring means and said plate springs for flexing the latter, and means connecting said last named means with the bolster for limiting movement of the former with respect to the latter.

22. In a railway car truck, side frames, spring means within the side frames, a bolster having its ends located within the side frames and formed with pockets, the bottom of each pocket having openings therein, a follower removably mounted within each pocket, a plurality of plate springs interposed between the follower and the top of the pocket, and a force applying member seated upon said spring means and having portions extending through the openings in the bottom of the pocket and engaging within the follower.

23. In a railway car truck, side frames, spring means within the side frames, a bolster having its ends located within the side frames and formed with pockets, the bottom of each pocket having openings therein, a follower removably mounted within each pocket, a plurality of plate springs interposed between the follower and the top of the pocket, a force applying member seated upon said spring means and having portions extending through the openings in the bottom of the pocket and engaging within the follower, and means connecting said force applying member with the bolster for preventing withdrawal of said portions from within the follower.

24. The combination with a truck bolster, side frames and spring means within the side frames supporting the bolster, of auxiliary cushioning and friction producing means located within the bolster for operation in series with said spring means, the deflection of the spring means serving in combination with the travel of the auxiliary means to give increased vertical displacement of the bolster.

25. A truck bolster provided at the bottom of each end with an opening, a follower mounted for vertical movement within each opening and adapted to seat upon bolster supporting springs located within a side frame, and a bank of elongated plate springs located within each end of the bolster and engaging the follower to constitute cushioning means acting in series with the truck springs.

26. A truck bolster containing friction producing absorption mechanism adapted to operate in series with the truck springs and embodying an element adapted to seat upon the springs.

27. In a truck bolster, the combination of an upwardly movable member mounted within each end thereof and adapted to seat upon the truck springs, and combined cushion and friction absorption mechanism within the bolster coacting with said upwardly movable member.

28. In a railway truck bolster, a pocket in each end thereof, a combined spring seat and follower mounted for vertical movement in the pocket, and a plurality of plate springs mounted within the pocket and adapted to be flexed upon upward vertical movement of said combined spring seat and follower.

29. A railway truck bolster provided internally with a plurality of plate springs, and means engaging said springs and the truck springs for placing the former under compression in series with the truck springs.

30. In a railway car truck, a bolster carrying adjacent the ends thereof resilient friction-producing means, spring means mounted on said truck, and means interposed between said friction-producing means and the adjacent spring means whereby said friction-producing means and said spring means are adapted to coact to reduce excessive oscillations of said bolster.

In testimony whereof I affix my signature.

MARK H. MARTIN.